US012259741B2

(12) United States Patent
Dickerson

(10) Patent No.: US 12,259,741 B2
(45) Date of Patent: Mar. 25, 2025

(54) STATISTICAL ARRAY VOLTAGE DIVIDER

(71) Applicant: Arbiter Systems, Inc., Paso Robles, CA (US)

(72) Inventor: William J. Dickerson, Saint George, UT (US)

(73) Assignee: Arbiter Systems, Inc., Paso Robles, CA (US)

( * ) Notice: Subject to any disclaimer, the term of this patent is extended or adjusted under 35 U.S.C. 154(b) by 279 days.

(21) Appl. No.: 17/942,013

(22) Filed: Sep. 9, 2022

(65) Prior Publication Data

US 2024/0085931 A1 Mar. 14, 2024

(51) Int. Cl.
*G05F 1/46* (2006.01)

(52) U.S. Cl.
CPC ...................................... *G05F 1/46* (2013.01)

(58) Field of Classification Search
CPC ..................................... G05F 1/46; G05F 1/10
See application file for complete search history.

(56) References Cited

U.S. PATENT DOCUMENTS

| | | | | |
|---|---|---|---|---|
| 7,714,694 B2 * | 5/2010 | Landsberger | ....... | H01L 27/0802 338/195 |
| 8,453,097 B2 * | 5/2013 | Mallinson | ............... | G06F 30/36 716/132 |
| 9,098,663 B2 * | 8/2015 | Mallinson | ............... | G06F 30/30 |
| 9,361,419 B2 * | 6/2016 | Blair | ..................... | G06F 30/392 |
| 10,312,931 B2 * | 6/2019 | Zhang | ................... | H03M 1/185 |

* cited by examiner

*Primary Examiner* — Adolf D Berhane
(74) *Attorney, Agent, or Firm* — Fitch, Even, Tabin & Flannery LLP

(57) ABSTRACT

One or more aspects of the techniques and designs described herein may be implemented to provide (e.g., to design, produce, etc.) improved voltage dividers (e.g., more accurate and efficient resistor voltage divider networks). For example, the present disclosure may enable voltage dividers (e.g., resistor voltage divider networks) with a high ratio, such as with a voltage divider ratio K on the order of 100 or more, using a plurality of nominally-identical resistor elements (e.g., such that a significant portion of non-ideal behaviors cancel out and remaining non-ideal behaviors are reduced by statistical averaging). For instance, accurate resistor voltage divider networks may be designed and built using an input resistor having N nominally-identical resistor elements in series and an output resistor having M such resistor elements in parallel. In some examples, an operational amplifier may also be coupled in parallel to the multiplicity of M resistor element strings.

17 Claims, 6 Drawing Sheets

STATISTICAL ARRAY VOLTAGE DIVIDER

BACKGROUND OF THE INVENTION

1. Field of the Invention

The present invention relates generally to electrical circuits and voltage division, and more specifically to a statistical array voltage divider.

2. Discussion of the Related Art

Various systems and processes are known in the art for a voltage divider.

The field of electronics and electric power industries are associated with a branch of physics and electrical engineering that deals with the emission, behavior, and effects of electrons and electric power (e.g., using electronic devices). For instance, electric power may be produced by electric generators, supplied by sources such as electric batteries, etc. In some cases, homes, businesses, and other establishments may be provided such electric power via the electric power industry, for example, through an electric power grid.

Electronic circuits may include various individual electronic components connected by conductive wires or traces through which electric current can flow. In electronics, a voltage divider (e.g., or a potential divider) is a passive linear circuit that produces a reduced output voltage from an input voltage. For instance, a voltage divider may distribute an input voltage ($V_{in}$) amongst components (e.g., resistor elements) of the voltage divider, such that the resulting output voltage ($V_{out}$) is a fraction of the input voltage ($V_{in}$).

In some aspects, the accuracy of a voltage divider may depend on the ratio of the components (e.g., the ratio of resistors, which in some cases may be more complex, such as resistors in parallel with capacitors, or capacitors alone for some alternating current applications, etc.). The ratio (e.g., and the accuracy of the ratio of a voltage divider) may vary with numerous factors, including initial construction accuracy, voltage coefficient, drift or aging, temperature coefficient, etc. Improved voltage divider techniques and designs may be desired, for example, such as techniques and designs for more accurate voltage dividers, accurate voltage dividers with reduced cost, accurate voltage dividers with reduced complexity, etc.

SUMMARY

An apparatus, system, and method for a statistical array voltage divider are described. One or more aspects of the apparatus, system, and method include a first multiplicity of nominally-identical resistor elements and a second multiplicity of nominally-identical resistor elements. The first multiplicity of nominally-identical resistor elements comprises N nominally-identical resistor elements, wherein the first multiplicity of nominally-identical resistor elements are coupled to one another in a series arrangement of N nominally-identical resistor elements comprising a first series end and a second series end. The second multiplicity of nominally-identical resistor elements comprises M nominally-identical resistor elements, wherein the second multiplicity of nominally identical resistor elements are coupled to one another in a parallel arrangement of M nominally-identical resistor elements comprising a first parallel end and a second parallel end. The second series end is electrically coupled to the first parallel end at an output node, wherein the first series end comprises an input node.

A method, apparatus, and system for a statistical array voltage divider are described. One or more aspects of the method, apparatus, and system include providing a first multiplicity of nominally-identical resistor elements comprising N nominally-identical resistor elements, wherein the first multiplicity of nominally-identical resistor elements are coupled to one another in a series arrangement of N nominally-identical resistor elements comprising a first series end and a second series end. One or more aspects of the method, apparatus, and system further include providing a second multiplicity of nominally-identical resistor elements comprising nominally-identical resistor elements, wherein the second multiplicity of nominally identical resistor elements are coupled to one another in a parallel arrangement of M nominally-identical resistor elements comprising a first parallel end and a second parallel end. One or more aspects of the method, apparatus, and system further include and electrically coupling the second series end to the first parallel end at an output node, wherein the first series end comprises an input node.

DETAILED DESCRIPTION

Figure 1:
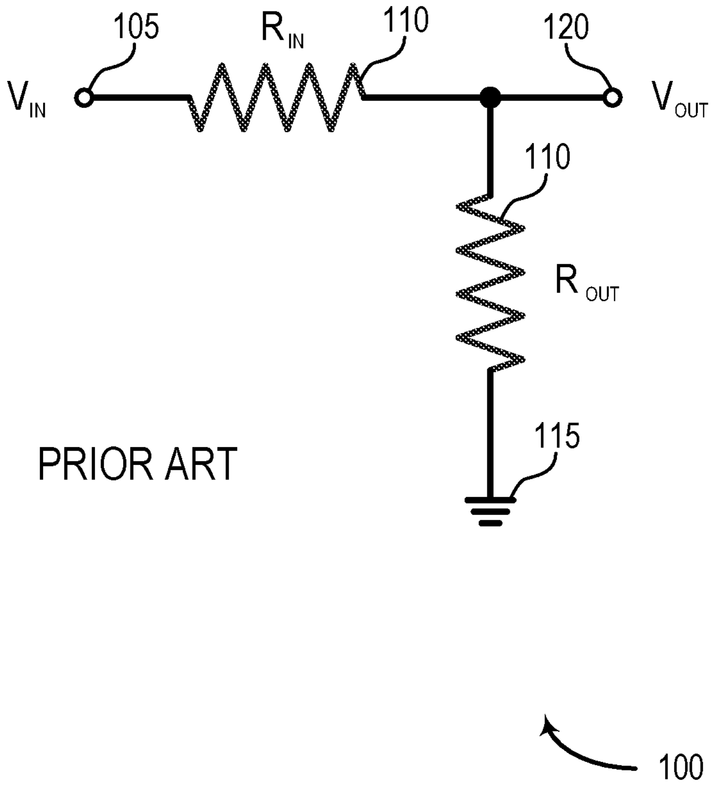
FIGS. 1 through 4 show example resistor voltage divider networks according to one or more aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of various types of electronics, to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In electronics, a voltage divider (e.g., or a potential divider) is a passive linear circuit that produces a reduced output voltage from an input voltage. For instance, a voltage divider may distribute an input voltage ($V_{in}$) amongst components (e.g., resistor elements) of the voltage divider, such that the resulting output voltage ($V_{out}$) is a fraction of the input voltage ($V_{in}$). As such, voltage dividers may be used in various applications, for example, to reduce a voltage (e.g., a high applied input voltage ($V_{in}$)) to a smaller output voltage ($V_{out}$) that can more easily be handled. An example application of voltage dividers may include voltage measurement (e.g., where a voltage to be measured may be many hundreds of times larger than voltage levels that available measurement circuitry can accept/handle, and a voltage divider may be implemented to reduce the voltage to a quantity that is measurable by the available measurement circuitry). Another example application of voltage dividers may include setting the gain of an amplifier circuit, among various other potential applications.

In some aspects, the accuracy of a voltage divider may depend on the ratio of the components (e.g., the ratio of resistors, which in some cases may be more complex, such as resistors in parallel with capacitors, or capacitors alone for some alternating current applications, etc.). The ratio may vary with numerous factors, including initial construction accuracy, voltage coefficient, drift or aging, temperature coefficient, etc.

Accordingly, designing and building a voltage divider of high accuracy demands accurate components. In many cases, it may be advantageous to obtain accuracy (e.g., accurate voltage divider networks) using less expensive components, for example, by taking advantage of the matching between components rather than their absolute values.

In some aspects, the matching between components is better the closer the components are to each other in their characteristics. In some cases, the matching between two components whose values differ by more than an order of magnitude, for constructing a voltage divider suitable for many applications, is little or no better than the base specifications of the parts. In some aspects, improved matching is had by using similar value (e.g., equal-value) resistive elements made simultaneously on a substrate, with the resistors as close to each other as is practical.

In some cases, making a resistor divider in this way may not be feasible (e.g., due to the tooling cost involved or other practical limitations). Therefore, it may be desirable to make the divider from individual, nominally-identical resistive elements. The accuracy of such a divider may then depend on the matching of the elements, which can be enhanced by using resistors made at the same time with the same process. Such resistors can be found, for instance, in adjacent positions in a reel of components purchased from a resistor manufacturer.

One or more aspects of the techniques and designs described herein may be implemented to provide (e.g., to design, produce, etc.) improved voltage dividers (more accurate voltage dividers, wider range voltage dividers, accurate voltage dividers with reduced cost, accurate voltage dividers with reduced complexity, etc.).

For example, the present disclosure may enable voltage dividers (e.g., resistor voltage divider networks) with a high ratio, such as with a ratio K on the order of 100 or more, using a plurality of nominally-identical resistor elements (e.g., such that a significant portion of non-ideal behaviors cancel out and remaining non-ideal behaviors are reduced by statistical averaging). For instance, improved voltage dividers (e.g., accurate resistor voltage divider networks) may be designed and built using an input resistor having N nominally-identical resistor elements in series and an output resistor having M such resistor elements in parallel. Such examples, as well as other examples, are described in more detail herein with reference to FIGS. 1 through 6.

FIG. 1 shows an example of a resistor voltage divider network 100 according to aspects of the present disclosure. Resistor voltage divider network 100 is an example of, or includes aspects of, the corresponding element described with reference to FIGS. 2-4. In one aspect, resistor voltage divider network 100 includes input node 105, resistor elements 110, ground node 115, and output node 120. Input node 105, resistor elements 110, ground node 115, output node 120 are each examples of, or each include aspects of, corresponding elements described with reference to FIGS. 2-4.

A voltage divider (e.g., resistor voltage divider network 100) may distribute an input voltage ($V_{in}$) amongst components (e.g., resistor elements 110) of the voltage divider, such that the resulting output voltage ($V_{out}$) is a fraction of the input voltage ($V_{in}$). As such, voltage dividers (e.g., such as resistor voltage divider network 100) may be used in various applications, for example, to reduce a high applied input voltage ($V_{in}$) to a smaller output voltage ($V_{out}$) that can more easily be handled.

As described in more detail herein, one or more aspects of the present disclosure may be implemented for improved voltage dividers (e.g., more accurate resistor voltage divider networks 100). For instance, resistor voltage divider networks 100 may be designed and built using an input resistor ($R_{in}$) having N nominally-identical resistor elements 110 in series and an output resistor ($R_{out}$) having M nominally-identical resistor elements 110 in parallel, as described in more detail herein with reference to the examples of FIGS. 2, 3, and 4.

Figure 2:
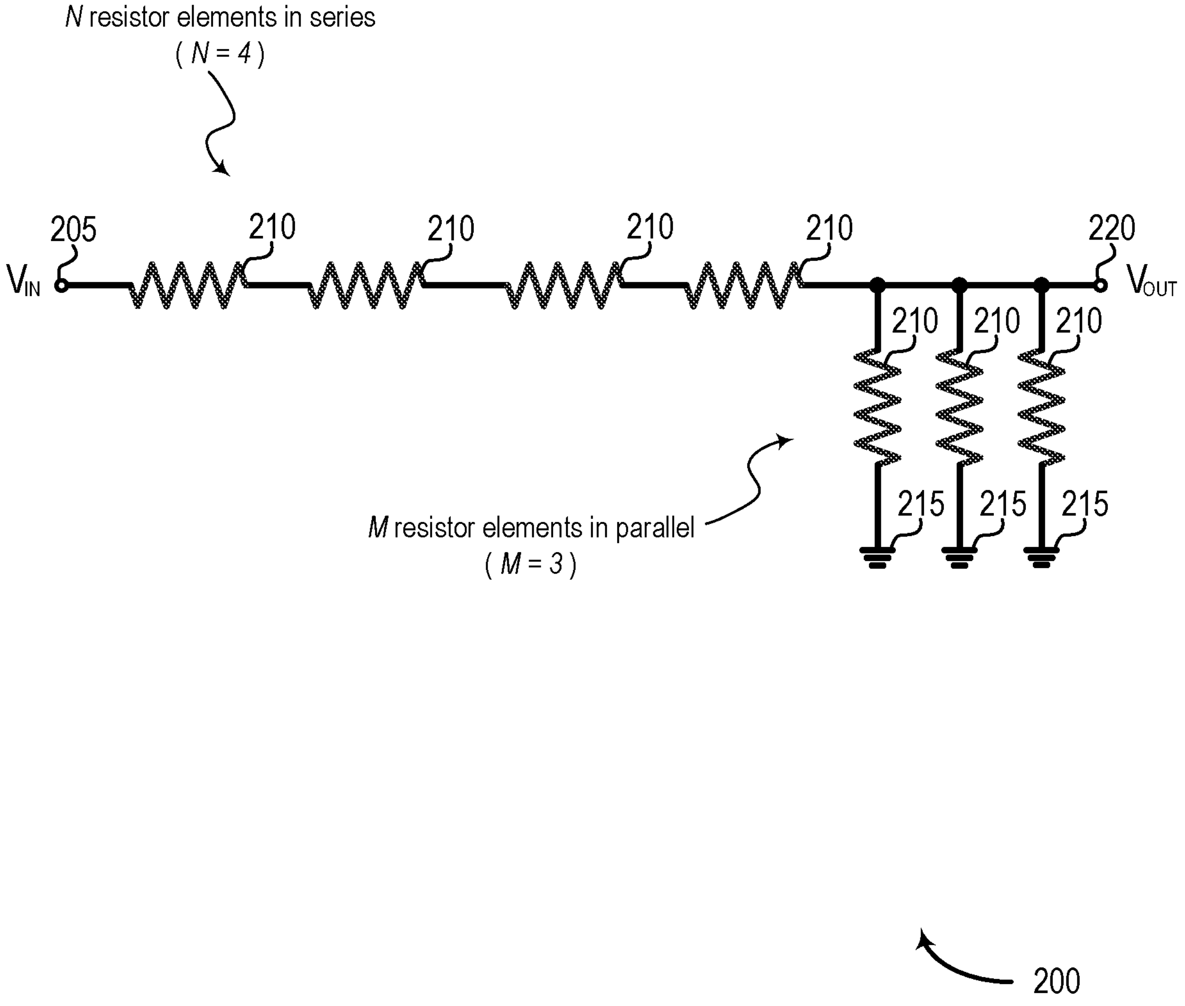

FIG. 2 shows an example of a resistor voltage divider network 200 according to aspects of the present disclosure. Resistor voltage divider network 200 is an example of, or includes aspects of, the corresponding element described with reference to FIGS. 1, 3, and 4. In one aspect, resistor voltage divider network 200 includes input node 205, resistor elements 210, ground node 215, and output node 220. Input node 205, resistor elements 210, ground node 215, and output node 220 are each examples of, or each include aspects of, corresponding elements described with reference to FIGS. 1, 3, and 4.

Resistor voltage divider network 200 shows an example configuration of resistor elements 210 (e.g., for voltage division applications). The ratio K of an input resistor ($R_{in}$) having N nominally-identical resistor elements 210 in series, and an output resistor ($R_{out}$) having M such resistor elements 210 in parallel, may be described (or defined) by Equation 1.

$$K=N\cdot M+1 \quad \text{Equation 1:}$$

One or more aspects of the techniques and designs described herein provide for improved dividers (e.g., resistor voltage divider networks 200 with improved accuracy, reduced costs, etc.). For instance, resistor voltage divider networks 200 according to the present disclosure may include a first multiplicity of nominally-identical resistor elements 210 and a second multiplicity of nominally-identical resistor elements 210.

The first multiplicity of nominally-identical resistor elements 210 may comprise N nominally-identical resistor elements 210 (e.g., N nominally-identical resistor elements 210 coupled to one another in a series arrangement). In some aspects, the series of first multiplicity of nominally-identical resistor elements 210 comprises a first series end (e.g., an input end) and a second series end (e.g., an output end).

The second multiplicity of nominally-identical resistor elements 210 may comprise M nominally-identical resistor elements 210 (e.g., M nominally-identical resistor elements 210 coupled to one another in a parallel arrangement). In some aspects, the parallel arrangement of the second multiplicity of nominally-identical resistor elements 210 comprises a first parallel end and a second parallel end. As shown, the second series end (e.g., the output end of the N nominally-identical resistor elements 210 coupled to one another in a series arrangement) may be electrically coupled to the first parallel end at an output node 220. Moreover, the first series end (e.g., the input end of the N nominally-identical resistor elements 210 coupled to one another in a series arrangement) may comprise an input node 205.

The series arrangement (e.g., of N nominally-identical resistor elements 210) and the parallel arrangement (e.g., of M nominally-identical resistor elements 210) may be arranged in a series voltage divider configuration, producing a ratio K=N*M+1, where K is the ratio of a voltage at the input node 205 to a voltage at the output node 220.

For clarity, FIG. 2 illustrates an example with M=3 and N=4. It will be understood that many embodiments will include larger numbers of resistor elements (e.g. N~10-100, M~10-100).

In some aspects, the second parallel end (e.g., of the parallel arrangement of the M nominally-identical resistor elements 210) comprises a ground node 215. In some aspects, the output node 220 is an output of a voltage divider, and first series end 205 is an input of the voltage divider.

Figure 3:
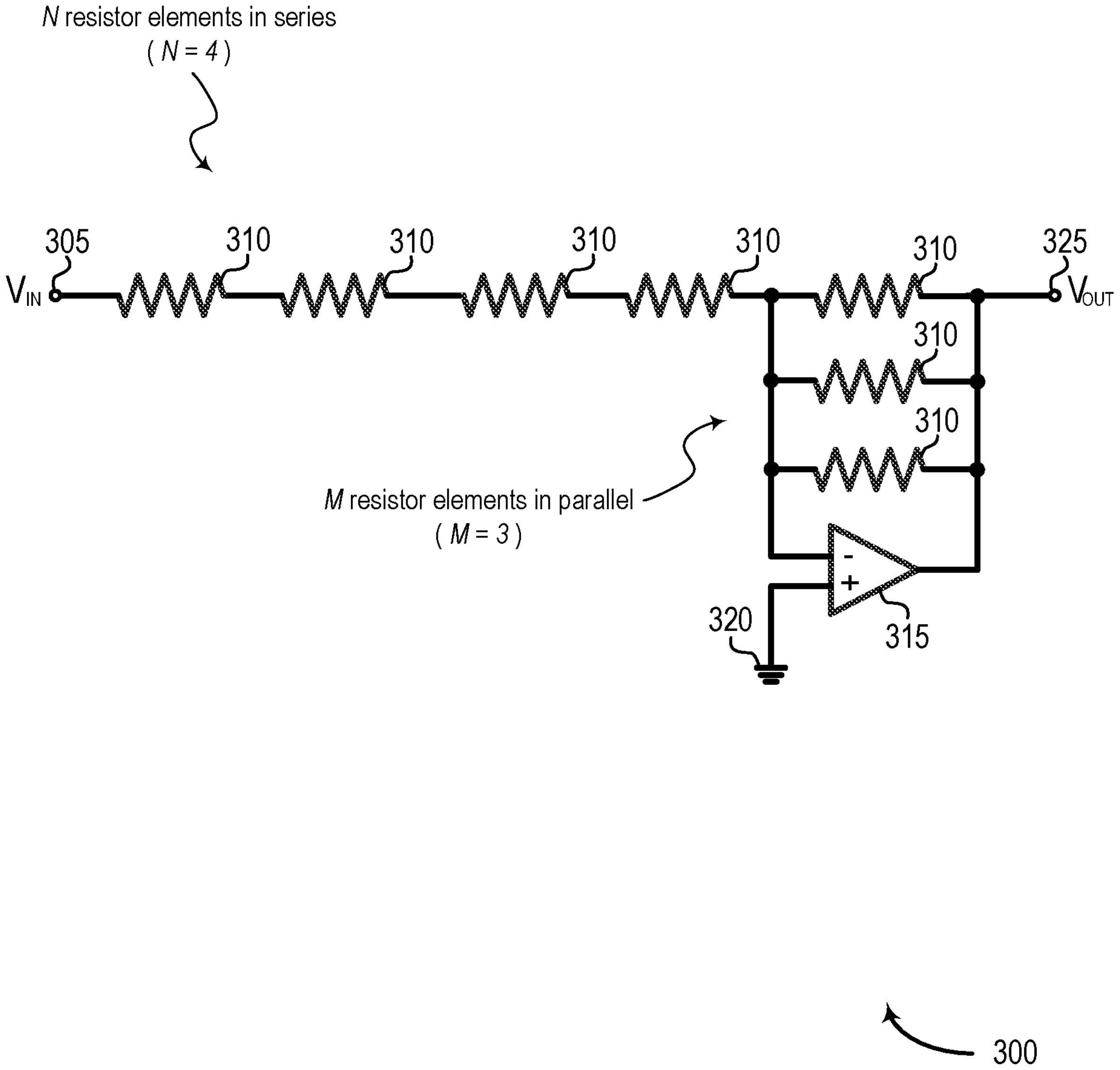

FIG. 3 shows an example of a resistor voltage divider network 300 according to aspects of the present disclosure. Resistor voltage divider network 300 is an example of, or includes aspects of, the corresponding element described with reference to FIGS. 1, 2, and 4. In one aspect, resistor voltage divider network 300 includes input node 305, resistor elements 310, operational amplifier 315, ground node 320, and output node 325. Input node 305, resistor elements 310, ground node 320, and output node 325 are each examples of, or each include aspects of, corresponding elements described with reference to FIGS. 1, 2, and 4. Operational amplifier 315 is an example of, or includes aspects of, the corresponding element described with reference to FIG. 4.

In some cases, a voltage divider (e.g., such as resistor voltage divider network 300, resistor voltage divider network 400, etc.) may include an operational amplifier 315. An operational amplifier 315 may comprise an inverting amplifier input, a non-inverting amplifier input, and an amplifier output. Using a voltage divider in a feedback path of an operational amplifier 315 may produce similar results (e.g., resistor voltage divider network 300 may produce similar results as resistor voltage divider network 200, in some aspects), but with a slightly different ratio K, which may be described (or defined) by Equation 2.

$$K=-N*M \quad \text{Equation 2:}$$

Accordingly, in this way, a wide range voltage divider ratios may be designed (e.g., a wide range of values of K may be created). For instance, according to one or more aspects described herein, variations in the configuration of resistor elements 310 (e.g., more complex series vs. parallel combinations, etc.) may produce a nearly infinite set of K values.

The performance of described voltage dividers (e.g., such as resistor voltage divider network 300) can be determined from the characteristics of the individual resistor elements 310 and the configuration of the resistor networks. In theory, if the resistor elements 310 are truly identical, and they remain so forever, then the ratio is exact with no error (e.g., regardless of the actual resistor element 310 performance). Then, it can be noted that if the resistor elements 310 have random variations in resistance, in an approximately normal (e.g., Gaussian) statistical distribution, the variation of the resulting ratio is improved by the central limit theorem, compared to the performance of each individual resistor element.

According to the central limit theorem, if a population comprises several sets of N individual nearly-identical elements (of whatever sort) and the averages of the sets are computed: the variance of the averages of the sets will be equal to N times the variance of the overall population; and the standard deviation (distribution) will have a value of the square root of N times the standard deviation of the overall population.

For example, if we have strings of N=100 resistor elements 310 in series, the nominal resistance of each string will be 100 times the resistance of a single resistor element. However, by the central limit theorem, the standard deviation of the total resistance of the resistor element strings will be only ten times that of the individual resistor elements 310. That is, the standard deviation as a fraction of the resistance of the string will be one-tenth of the standard deviation of the population of resistor elements 310 as a whole (e.g., also as a fraction of their nominal resistance). The error (e.g., the standard deviation of the resistor element string, divided by the resistance of the string) is thus improved by a factor equal to the square root of N (e.g., $\sqrt{N}$).

For a parallel array, the conductance of the network may be analyzed, and the parallel array is the dual of the series array when analyzed for conductance rather than resistance. The parallel array may have a conductance 100 times that of a single element, and a variation of conductance that is 10 times that of a single element. Expressed as a resistance, the resistance may be 0.01 times that of a single resistor element, and the variation may be 0.001 times or again one-tenth (or $$\frac{1}{\sqrt{N}},$$

when N=100).

In examples where such resistor elements are used to form a voltage divider (e.g., such as shown in the example of FIG. 2), the resistor voltage divider network may have a ratio of 10,001:1 and a variation in the ratio of 200. Thus, the overall performance of the resistor voltage divider network may be improved by statistical averaging: where the original variation was unity, the variation of the resistor voltage divider network so created is 200/10,001 or approximately 0.02 of the resulting ratio R.

This observation can be generalized for values of M and N as described herein, such that the resulting ratio R may be improved by aspects of Equation 3.

$$variation_{ratio} = (variation_{inIndividualComponent}) * \left(\frac{1}{\sqrt{N}} + \frac{1}{\sqrt{M}}\right) \quad \text{Equation 3}$$

Sources of variation (e.g., all sources of variation) in the individual resistor elements 310 may be seen, by definition, to either be correlated or non-correlated. The correlated part is that part of the variation that is similar (e.g., identical) for all resistor elements 310 (M+N, in the present example), and the correlated part may be found by summing the variations of all resistor elements 310 and dividing by the number of resistor elements 310. Therefore, the non-correlated part is that part of the variation which remains; thus the total variation (by definition) can be broken into two components:

a correlated portion and a non-correlated portion, accounting for all of the original variation.

The correlated part of the variance can be seen by inspection to cancel in any resistor voltage divider network comprised of nominally-identical elements (e.g., the correlated part of the variance is that portion of the variance that is actually the same for all elements). Then, the remaining part (e.g., the non-correlated part) is very likely to have a normal distribution, because the non-normal (systematic) variation is the correlated part, and what is left may be random differences between the nominally-identical elements. So the central limit theorem applies (and a more detailed analysis of the importance of assuming a normal distribution may show that it does not make that much difference to the result).

Table 1 shows an example of possible characteristics for an example resistor voltage divider network comprising 200 nominally-identical elements with N=100 and M=100 (e.g., where the example resistor voltage divider network may apply some typical characteristics of reasonably high-quality film resistors that are inexpensive enough to be considered for use in quantities of 200 to make such a divider).

TABLE 1

| | |
|---|---|
| Temperature coefficient (TC) | 25 ppm/K |
| Aging | 10 ppm/sqrt(k-hour) |
| Initial tolerance | 0.1% |

It may be reasonable to expect, without any specific knowledge to the contrary, that roughly half of the variations will be correlated, for example, due to the resistor elements 310 being nominally-identical and due to quite a bit of the variation that may be caused by systematic effects that affect each resistor element 310 identically. Then, the remaining random variations, which may not be correlated, may also be roughly half.

This assumption is not critical, and any allocation (of correlated variations and non-correlated variations) may be tried and implemented by analogy, without departing from the scope of the present disclosure. A bad (e.g., worst) case may be when all of the variation is assumed as non-correlated (e.g., which is highly unlikely for nominally-identical parts), however the improvements as described herein still result in a significant increase in performance. As the correlated part of the variation largely cancels (or cancels completely), the resulting resistor voltage divider network has reduced error (e.g., or no error whatsoever if the elements are truly identical).

According to examples described herein, using an assumption of half correlated variation and half non-correlated variation, the resulting ratio error, due to the initial tolerance, may be found or determined as 0.01%; the temperature coefficient (TC) of the ratio is $$\frac{2.5ppm}{K},$$

and the ratio aging is $$\frac{1ppm}{\sqrt{k-\text{hour}}}.$$

In the worst case (e.g., with 100% of the variation due to non-correlated, random factors), the errors may be twice or double the example errors stated. However, it is quite likely that more than half of the original errors are actually correlated (e.g., in which case the actual errors may be less than the example errors stated).

The level of performance available or achievable using a statistical array of similar resistor elements 310 to build a resistor voltage divider network (e.g., as described herein) easily exceeds that which is available by conventional means at a comparable component cost. The larger the ratio, the better the performance. However, even a ratio of 101:1 obtained with twenty resistor elements 310 (N=10, M=10) will deliver improved performance compared to the resistor elements 310 themselves (e.g., temperature coefficient (TC)

$$\frac{8ppm}{k},$$

aging $$\frac{3ppm}{\sqrt{k-\text{hour}}}$$

and initial ratio error 0.03%). And since only twenty resistor elements 310 may be implemented in such an example, higher-quality parts might be used, or an increase in performance can be had, by simply paralleling several such dividers so that the total number of parts is greater.

One example is to put two identical twenty-resistor element dividers in parallel, improving the performance by the square root of 2 (e.g., performance may be improved by $\sqrt{2}$). In general, the central limit theorem predicts that the performance will scale approximately with the square root of the number of resistor elements 310 used, and further, that performance can be shown to be optimized when M and N are approximately the same, both close to the square root of the desired overall ratio. In some aspects, M and N need not be identical (e.g., so far as M and N are within a ratio of 2 to 3), and performance from Equation 3 may only be slightly reduced than if M and N were equal.

Examples where M need not be exactly equal to N may be important, for example, in building resistor voltage divider networks to accept a very high input voltage. The voltage capability of a resistor voltage divider network is set by the input resistor string, comprised of N individual resistor elements 310 in series. If each resistor element 310 has a capability of accepting 500 volts, then the overall string will accept N*500 volts. Increasing the number N will improve the voltage capability of the resistor voltage divider network, whereas increasing M may not improve the voltage capability of the resistor voltage divider network. As such, a resistor voltage divider network with, for example, a ratio of 600:1 may be obtained by using, for example, N=25 and M=24 (e.g., which would give the least error of, for example, 0.404 via Equation 3). As another example, a resistor voltage divider network with, for example, a ratio of 600:1 may be obtained using, for example, N=30 and M=20 (e.g., for an error of 0.406 via Equation 3). However, the voltage capability of a resistor voltage divider network with N=30 may be 30/25, or 1.2 times the resistor voltage divider network with N=25.

One or more aspects of the techniques and designs described herein provide for improved dividers (e.g., resistor voltage divider networks 300 with improved accuracy, reduced costs, etc.). For instance, resistor voltage divider networks 300 according to the present disclosure may include a first multiplicity of N nominally-identical resistor elements 310 and a second multiplicity of M nominally-identical resistor elements 310. The first multiplicity of N nominally-identical resistor elements 310 may be coupled to one another in a series arrangement. In some aspects, the series of N nominally-identical resistor elements 310 comprises a first series end (e.g., an input end) and a second series end (e.g., an output end). The second multiplicity of M nominally-identical resistor elements 310 may be coupled to one another in a parallel arrangement. In some aspects, the parallel arrangement of M nominally-identical resistor elements 310 comprises a first parallel end and a second parallel end. As shown, the second series end (e.g., the output end of the N nominally-identical resistor elements 310 coupled to one another in a series arrangement) may be electrically coupled to the first parallel end at an output node 325. Moreover, the first series end (e.g., the input end of the N nominally-identical resistor elements 310 coupled to one another in a series arrangement) may comprise an input node 305.

The example resistor voltage divider network 300 of FIG. 3 includes an operational amplifier 315 coupled in parallel to the parallel arrangement of M nominally-identical resistor elements 310. The series arrangement (e.g., of N nominally-identical resistor elements 310) and the parallel arrangement (e.g., of M nominally-identical resistor elements 310) may be arranged as an input resistor and a feedback resistor setting of an amplifier circuit, producing a ratio K=−N*M, where K is the ratio of a voltage at the input node 305 to a voltage at the output node 325.

In some aspects, the second parallel end (e.g., of the parallel arrangement of the M nominally-identical resistor elements 310) comprises a ground node 320. In some aspects, the output node 325 is an output of a voltage divider, and first series end 305 is an input of the voltage divider.

For clarity, FIG. 3 illustrates an example with M=3 and N=4. It will be understood that many embodiments will include larger numbers of resistor elements (e.g. N~10-100, M~10-100).

Figure 4:
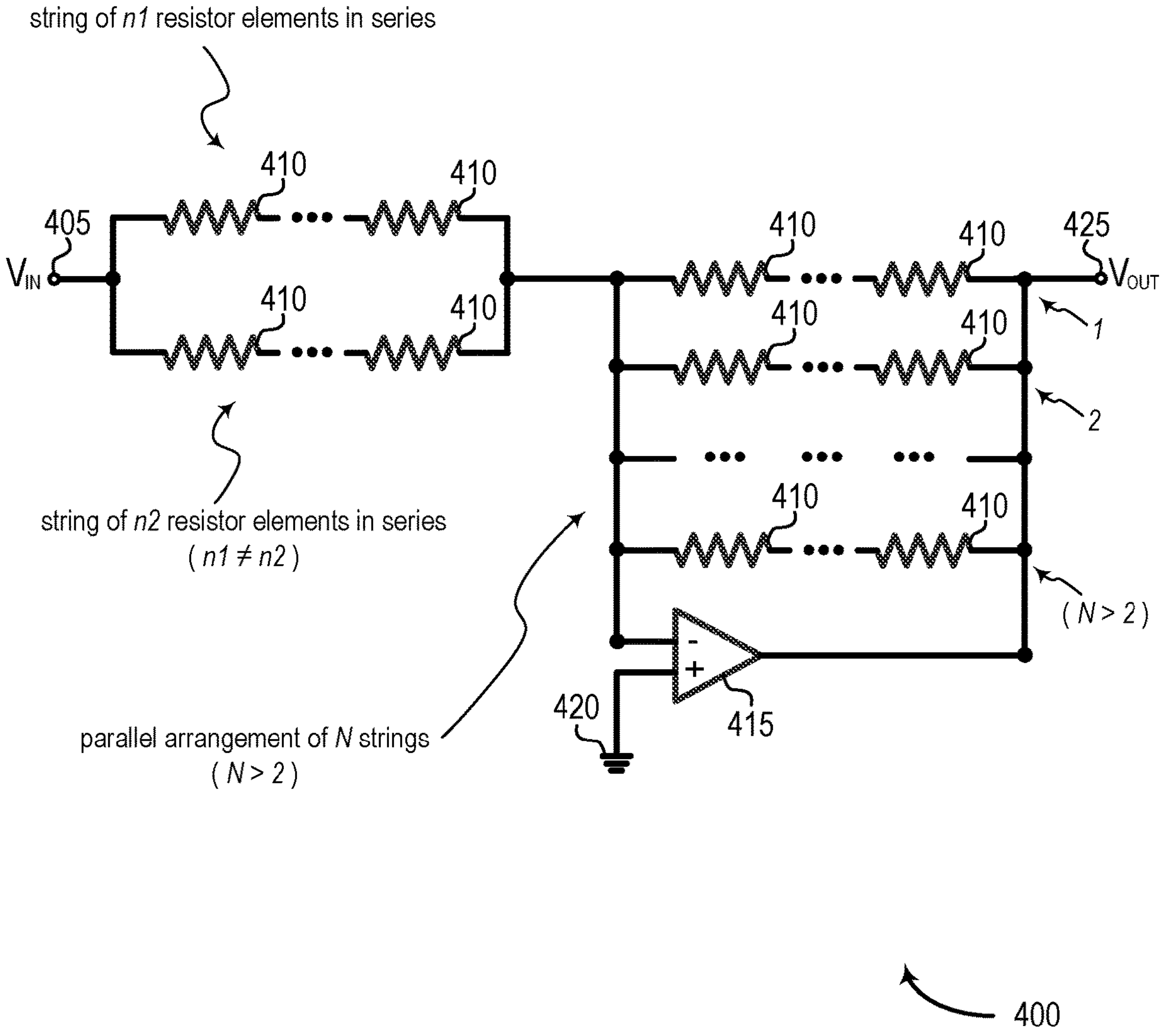

FIG. 4 shows an example of a resistor voltage divider network 400 according to aspects of the present disclosure. Resistor voltage divider network 400 is an example of, or includes aspects of, the corresponding element described with reference to FIGS. 1-3. In one aspect, resistor voltage divider network 400 includes input node 405, resistor elements 410, operational amplifier 415, ground node 420, and output node 425. Input node 405, resistor elements 410, ground node 420, and output node 425 are each examples of, or each include aspects of, corresponding elements described with reference to FIGS. 1-3. Operational amplifier 415 is an example of, or includes aspects of, the corresponding element described with reference to FIG. 3.

Resistor voltage divider network 400 in the example of FIG. 4 shows an example of a resistor voltage divider network comprising a number of nominally-identical resistor elements 410, configured in a complex series/parallel combination network to produce a ratio K. The complex series/parallel combination network includes a first group of resistor elements 410 and a second group of resistor elements 410.

The first group of resistor elements 410 may include a first string of n1 resistor elements 410 in series and a second string of n2 resistor elements 410 in series, where n1 does not equal n2. The first string of n1 resistor elements 410 and the second string of n2 resistor elements 410 may be arranged in parallel, sharing an input node and an output node.

The second group of resistor elements 410 includes a multiplicity of resistor element strings, wherein each resistor element string has a number of resistor elements 410 (which may or may not be equal to any of the other strings) and each resistor element string is coupled in parallel with the other resistor element strings (e.g., all of the resistor element strings of the second group share an input node and an output node). The output node of the first group of resistor elements 410 is coupled to the input node for the second group of resistor elements 410.

In some examples (e.g., such as the example of FIG. 4), an operational amplifier may be coupled in parallel to the multiplicity of resistor element strings (e.g., one or more aspects of which are further described herein, for example, with reference to the description and example configuration of FIG. 3).

In some embodiments, the resistor voltage divider network may include N+M nominally-identical resistor elements 410 where the "input resistor" is N resistor elements 410 in series the "output resistor" is M resistor elements 410 in parallel, thereby producing a net improvement in ratio performance that can be estimated statistically from the values of N and M in combination with knowledge about the performance of the individual resistor elements 410.

In some embodiments, a resistor voltage divider network may include an input resistor and output resistor arranged in a series voltage divider configuration (e.g., which, in some aspects, may produce a ratio K=N*M+1, as described in more detail herein, for example, with reference to the description and example configuration of FIG. 2).

In some embodiments, a resistor voltage divider network may include an input resistor and output resistor arranged as the input and feedback resistor setting the gain of an amplifier circuit (e.g., which, in some aspects, may produce a ratio K=−N*M, as described in more detail herein, for example, with reference to the description and example configuration of FIG. 3).

In some embodiments, the resistor voltage divider network may include a number of nominally-identical resistor elements 410, configured in a complex series/parallel combination network to produce a ratio K, where more resistor elements 410 are used (e.g., more resistor elements 410 than what may be used for the circuit of the example of FIG. 2), producing a larger improvement in performance, and/or a more complex ratio K is provided than would be available with a combination of a series string and a parallel element (e.g., as shown in FIG. 2).

In some embodiments, a resistor voltage divider network 400 may include an input resistor (e.g., one or more "input" resistor elements 410, $R_{in}$, in series) and output resistor element (e.g., one or more "output" resistor elements 410, $R_{out}$, in parallel) arranged as the input and feedback resistor setting the gain of an amplifier circuit.

One or more aspects of the techniques and designs described herein provide for improved dividers (e.g., resistor voltage divider networks 400 with improved accuracy, reduced costs, etc.). For instance, resistor voltage divider networks 400 according to the present disclosure may include a first multiplicity of N nominally-identical resistor elements 410 and a second multiplicity of M nominally-identical resistor elements 410.

The first multiplicity of N nominally-identical resistor elements 410 may be coupled to one another in a series arrangement. In some aspects, the series of N nominally-identical resistor elements 410 comprises a first series end (e.g., an input end) and a second series end (e.g., an output end).

The second multiplicity of M nominally-identical resistor elements 410 may be coupled to one another in a parallel arrangement. In some aspects, the parallel arrangement of M nominally-identical resistor elements 410 comprises a first parallel end and a second parallel end. As shown, the second series end (e.g., the output end of the N nominally-identical resistor elements 410 coupled to one another in a series arrangement) may be electrically coupled to the first parallel end at an output node 425. Moreover, the first series end (e.g., the input end of the N nominally-identical resistor elements 410 coupled to one another in a series arrangement) may comprise an input node 405.

In some aspects, the resistor voltage divider network 400 (e.g., the resistor voltage divider network 400 of FIG. 4) includes a first additional multiplicity of nominally-identical resistor elements 410 and a second additional multiplicity of nominally-identical resistor elements 410. The first additional plurality of nominally-identical resistor elements 410 may be arranged in at least one additional series arrangement, where each of the at least one additional series arrangement has a first series end coupled to the first series end of the first multiplicity of nominally-identical resistor elements 410 and has a second series end coupled to the second series end of the first multiplicity of nominally-identical resistor elements 410. The second additional plurality of nominally-identical resistor elements 410 may be arranged with at least one of the second multiplicity of nominally-identical resistor elements 410 between the first parallel end and the second parallel end. In some aspects, the resistor voltage divider network 400 produces a ratio K, where K is the ratio of a voltage at the input node 405 to a voltage at the output node 425.

For instance, the example of FIG. 4 shows a parallel arrangement of two strings (e.g., a parallel arrangement of a first multiplicity of n1 nominally-identical resistor elements 410 and a first additional multiplicity of n2 nominally-identical resistor elements 410). The two strings may have a different number of elements in series (e.g., a different number of nominally-identical resistor elements 410 in series, such that $n1 \neq n2$). Moreover, the example of FIG. 4 shows a parallel arrangement of N ($N>2$) strings (e.g., a parallel arrangement of a second multiplicity of nominally-identical resistor elements 410 and a second additional multiplicity of nominally-identical resistor elements 410), with an arbitrary number of resistor elements 410 in each string.

Figure 5:
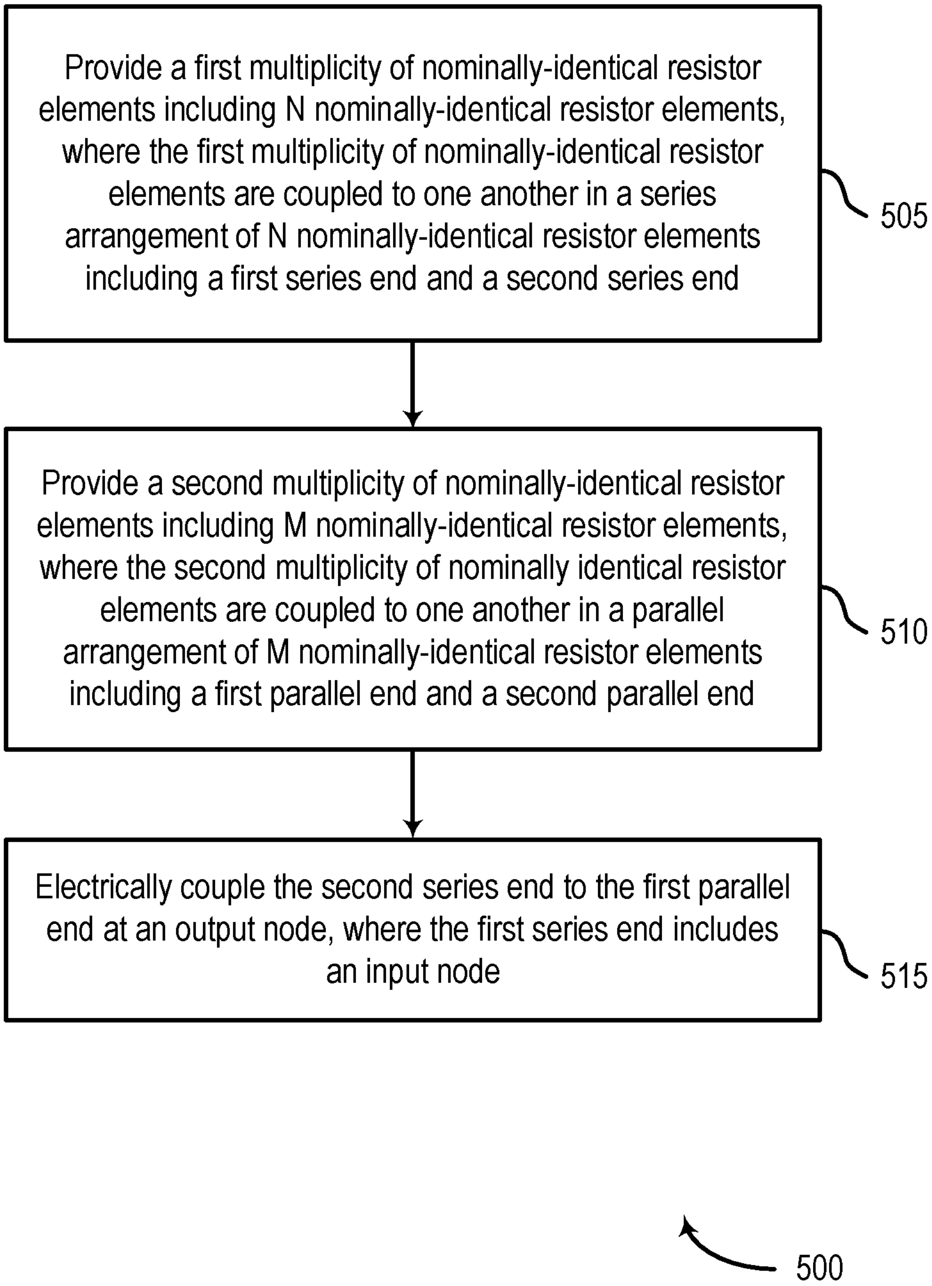
FIGS. 5 and 6 show examples of methods for electrical circuits and voltage division according to one or more aspects of the present disclosure.

FIG. 5 shows an example of a method 500 for electrical circuits and voltage division according to aspects of the present disclosure. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system provides a first multiplicity of nominally-identical resistor elements including N nominally-identical resistor elements, where the first multiplicity of nominally-identical resistor elements are coupled to one another in a series arrangement of N nominally-identical resistor elements including a first series end and a second series end. In some cases, the operations of this step refer to, or may be performed by, a resistor elements as described with reference to FIGS. 1-4.

At operation 510, the system provides a second multiplicity of nominally-identical resistor elements including M nominally-identical resistor elements, where the second multiplicity of nominally identical resistor elements are coupled to one another in a parallel arrangement of M nominally-identical resistor elements including a first parallel end and a second parallel end. In some cases, the operations of this step refer to, or may be performed by, a resistor elements as described with reference to FIGS. 1-4.

At operation 515, the system electrically couples the second series end to the first parallel end at an output node, where the first series end includes an input node. In some cases, the operations of this step refer to, or may be performed by, an output node as described with reference to FIGS. 1-4. In some cases, the operations of this step refer to, or may be performed by, an input node as described with reference to FIGS. 1-4.

In some cases, various aspects of operations 505-515 may be performed by, or facilitated by, a manufacturer, a manufacturing facility, a circuit designer, an engineer, and electrician, etc. (e.g., as described in more detail herein).

Figure 6:
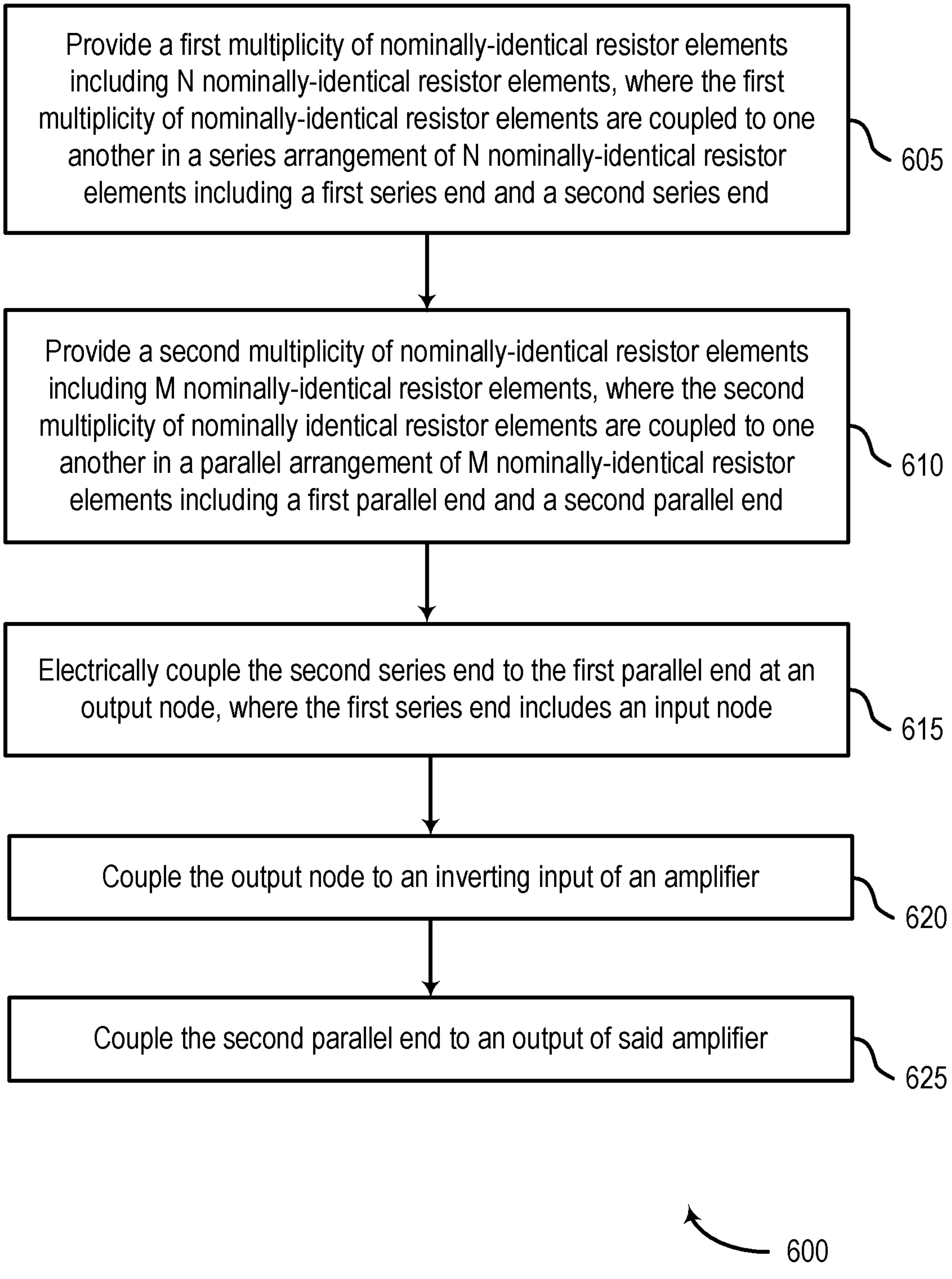

FIG. 6 shows an example of a method 600 for electrical circuits and voltage division according to aspects of the present disclosure. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system provides a first multiplicity of nominally-identical resistor elements including N nominally-identical resistor elements, where the first multiplicity of nominally-identical resistor elements are coupled to one another in a series arrangement of N nominally-identical resistor elements including a first series end and a second series end. In some cases, the operations of this step refer to, or may be performed by, a resistor elements as described with reference to FIGS. 1-4.

At operation 610, the system provides a second multiplicity of nominally-identical resistor elements including M nominally-identical resistor elements, where the second multiplicity of nominally identical resistor elements are coupled to one another in a parallel arrangement of M nominally-identical resistor elements including a first parallel end and a second parallel end. In some cases, the operations of this step refer to, or may be performed by, a resistor elements as described with reference to FIGS. 1-4.

At operation 615, the system electrically couples the second series end to the first parallel end at an output node, where the first series end includes an input node. In some cases, the operations of this step refer to, or may be performed by, an output node as described with reference to FIGS. 1-4. In some cases, the operations of this step refer to, or may be performed by, an input node as described with reference to FIGS. 1-4.

At operation 620, the system couples the output node to an inverting input of an amplifier. In some cases, the operations of this step refer to, or may be performed by, a resistor voltage divider network as described with reference to FIGS. 1-4.

At operation 625, the system couples the second parallel end to an output of said amplifier. In some cases, the operations of this step refer to, or may be performed by, a resistor voltage divider network as described with reference to FIGS. 1-4.

In some cases, various aspects of operations 605-625 may be performed by, or facilitated by, a manufacturer, a manufacturing facility, a circuit designer, an engineer, and electrician, etc. (e.g., as described in more detail herein).

While the invention herein disclosed has been described by means of specific embodiments, examples and applications thereof, numerous modifications and variations could be made thereto by those skilled in the art without departing from the scope of the invention set forth in the claims.

What is claimed is:

1. A resistor voltage divider network comprising:

a first multiplicity of nominally-identical resistor elements comprising N nominally-identical resistor elements, wherein said first multiplicity of nominally-identical resistor elements are coupled to one another in a series arrangement of N nominally-identical resistor elements comprising a first series end and a second series end;

a second multiplicity of nominally-identical resistor elements comprising M nominally-identical resistor elements, wherein said second multiplicity of nominally-identical resistor elements are coupled to one another in a parallel arrangement of M nominally-identical resistor elements comprising a first parallel end coupling first ends of the second multiplicity of nominally-identical resistors at a first node and a second parallel end coupling second ends of the second multiplicity of nominally-identical resistors at a second node;

wherein said second series end is electrically coupled to said first parallel end at a connecting node, wherein said first series end comprises an input node of the resistor voltage divider network and said second parallel end comprises an output node of the resistor voltage divider network.

2. The resistor voltage divider network of claim 1, wherein the series arrangement and the parallel arrangement are arranged in a series voltage divider configuration, producing a ratio K=N*M+1, where K is the ratio of a voltage at the input node to a voltage at the output node.

3. The resistor voltage divider network of claim 1, wherein the series arrangement and the parallel arrangement are arranged as an input resistor and a feedback resistor setting the gain of an amplifier circuit, producing a ratio K=−N*M, where K is the ratio of a voltage at the input node to a voltage at the output node.

4. The resistor voltage divider network of claim 1 further comprising:

a first additional multiplicity of nominally-identical resistor elements, wherein the first additional multiplicity of nominally-identical resistor elements is arranged in at least one additional series arrangement, wherein each of the at least one additional series arrangement has a first series end coupled to the first series end of the first multiplicity of nominally-identical resistor elements and has a second series end coupled to the second series end of the first multiplicity of nominally-identical resistor elements; and a second additional multiplicity of nominally-identical resistor elements, wherein each of the second additional plurality of nominally-identical resistor elements is arranged with at least one of the second additional multiplicity of nominally-identical resistor elements between the first parallel end and the second parallel end, whereby the resistor voltage divider network produces a ratio K, where K is the ratio of a voltage at the input node to a voltage at the output node.

5. The resistor voltage divider network of claim 1 wherein said connecting node is coupled to an inverting input of an amplifier, and wherein said second parallel end is coupled to an output of said amplifier.

6. A method of making a resistor voltage divider network comprising:

providing a first multiplicity of nominally-identical resistor elements comprising N nominally-identical resistor elements, wherein said first multiplicity of nominally-identical resistor elements are coupled to one another in a series arrangement of N nominally-identical resistor elements comprising a first series end and a second series end;

providing a second multiplicity of nominally-identical resistor elements comprising M nominally-identical resistor elements, wherein said second multiplicity of nominally-identical resistor elements are coupled to one another in a parallel arrangement of M nominally-identical resistor elements comprising a first parallel end coupling first ends of the second multiplicity of nominally-identical resistors at a first node and a second parallel end coupling second ends of the second multiplicity of nominally-identical resistors at a second node; and electrically coupling said second series end to said first parallel end at a connecting node, wherein said first series end comprises an input node of the resistor voltage divider network and said second parallel end comprises an output node of the resistor voltage divider network.

7. The method of claim 6, further comprising:

arranging the series arrangement and the parallel arrangement in a series voltage divider configuration, producing a ratio K=N*M+1, where K is the ratio of a voltage at the input node to a voltage at the output node.

8. The method of claim 6, further comprising:

arranging the series arrangement and the parallel arrangement as the input node and feedback resistor setting gain of an amplifier circuit, producing a ratio K=−N*M, where K is the ratio of a voltage at the input node to a voltage at the output node.

9. The method of claim 6, further comprising:

providing a first additional multiplicity of nominally-identical resistor elements, wherein the first additional multiplicity of nominally-identical resistor elements is arranged in at least one additional series arrangement, wherein each of the at least one additional series arrangement has a first series end coupled to the first series end of the first multiplicity of nominally-identical resistor elements and has a second series end coupled to the second series end of the first multiplicity of nominally-identical resistor elements; and providing a second additional multiplicity of nominally-identical resistor elements, wherein each of the second additional multiplicity of nominally-identical resistor elements is arranged with at least one of the second multiplicity of nominally-identical resistor elements between the first parallel end and the second parallel end, whereby the resistor voltage divider network produces a ratio K, where K is the ratio of a voltage at the input node to a voltage at the output node.

10. The method of claim 6, further comprising:

wherein said connecting node is coupled to an inverting input of an amplifier; and wherein said second parallel end is coupled to an output of said amplifier.

11. The resistor voltage divider network of claim 1, further comprising:

wherein each of the first multiplicity of nominally-identical resistor elements are nominally identical to each of the second multiplicity of nominally-identical resistor elements.

12. The resistor voltage divider network of claim 1, further comprising:

wherein the first multiplicity of nominally-identical resistor elements comprises at least ten nominally-identical resistor elements; and wherein the second multiplicity of nominally-identical resistor elements comprises at least ten nominally-identical resistor elements.

13. The method of claim 6, further comprising:

wherein each of the first multiplicity of nominally-identical resistor elements are nominally identical to each of the second multiplicity of nominally-identical resistor elements.

14. The method of claim 6, further comprising:

wherein the first multiplicity of nominally-identical resistor elements comprises at least ten nominally-identical resistor elements; and wherein the second multiplicity of nominally-identical resistor elements comprises at least ten nominally-identical resistor elements.

15. A resistor voltage divider network, comprising:

a first multiplicity of nominally-identical resistor elements comprising N nominally-identical resistor elements, wherein said first multiplicity of nominally-identical resistor elements are coupled to one another in a series arrangement of N nominally-identical resistor elements comprising a first series end and a second series end;

a second multiplicity of nominally-identical resistor elements comprising M nominally-identical resistor elements, wherein said second multiplicity of nominally-identical resistor elements are coupled to one another in a parallel arrangement of M nominally-identical resistor elements comprising a first parallel end coupling first ends of the second multiplicity of nominally-identical resistors at a first node and a second parallel end coupling second ends of the second multiplicity of nominally-identical resistors at a second node;

wherein said second series end is electrically coupled to said first parallel end at an output node of the resistor voltage divider, wherein said first series end comprises an input node of the resistor voltage divider.

16. The resistor voltage divider network of claim 15, further comprising:

wherein said second parallel end comprises a ground node.

17. The resistor voltage divider network of claim 15, wherein the series arrangement and the parallel arrangement are arranged in a series voltage divider configuration, producing a ratio $K=N*M+1$, where K is the ratio of a voltage at the input node to a voltage at the output node.

* * * * *